United States Patent
Fukuoka et al.

(10) Patent No.: US 10,891,332 B2
(45) Date of Patent: Jan. 12, 2021

(54) INSTRUMENTATION DIAGRAM DATA GENERATION DEVICE, INSTRUMENTATION DIAGRAM SEARCH SYSTEM, AND COMPUTER READABLE MEDIUM

(71) Applicant: MITSUBISHI ELECTRIC CORPORATION, Tokyo (JP)

(72) Inventors: Naoya Fukuoka, Tokyo (JP); Hiroki Kawano, Tokyo (JP); Tomooki Ukiana, Tokyo (JP); Toshihiro Mega, Tokyo (JP); Tomohiro Narui, Tokyo (JP); Tomohiro Sato, Tokyo (JP); Hiroto Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 108 days.

(21) Appl. No.: 16/323,719

(22) PCT Filed: Feb. 7, 2017

(86) PCT No.: PCT/JP2017/004436
§ 371 (c)(1),
(2) Date: Feb. 6, 2019

(87) PCT Pub. No.: WO2018/061240
PCT Pub. Date: Apr. 5, 2018

(65) Prior Publication Data
US 2020/0167383 A1 May 28, 2020

(30) Foreign Application Priority Data
Sep. 30, 2016 (JP) .................................. 2016-192640

(51) Int. Cl.
*G06F 16/00* (2019.01)
*G06F 16/58* (2019.01)
(Continued)

(52) U.S. Cl.
CPC ........ *G06F 16/5866* (2019.01); *G06F 16/258* (2019.01); *G06F 16/535* (2019.01); *G06F 16/538* (2019.01); *G06F 30/12* (2020.01)

(58) Field of Classification Search
CPC ...... G06F 16/00; G06F 16/258; G06F 16/535; G06F 16/538; G06F 16/5866;
(Continued)

(56) References Cited

U.S. PATENT DOCUMENTS

2006/0251059 A1* 11/2006 Otsu ..................... H04L 12/282
370/352
2007/0198587 A1* 8/2007 Kobayashi .............. G06F 30/23
(Continued)

FOREIGN PATENT DOCUMENTS

| JP | 2008-192009 A | 8/2008 |
| JP | 2012-113538 A | 6/2012 |

(Continued)

OTHER PUBLICATIONS

International Search Report (PCT/ISA/210) issued in PCT/JP2017/004436, dated May 16, 2017.

*Primary Examiner* — Anh Ly
(74) *Attorney, Agent, or Firm* — Birch, Stewart, Kolasch & Birch, LLP

(57) ABSTRACT

A control method analysis unit acquires a correspondence relation between signs and model numbers from an apparatus table of an instrumentation diagram, and acquires signs and apparatus symbols, and connection relation among apparatuses, from a drawing of the instrumentation diagram. Subsequently, the control method analysis unit acquires an apparatus classification drawn on the diagram by searching (Continued)

INSTRUMENTATION APPARATUS INFORMATION

| No | MODEL NUMBER | APPARATUS CLASSIFICATION |
|---|---|---|
| 1 | AY-XXX | DETECTION UNIT AND ADJUSTMENT UNIT |
| 2 | BY-XXX | OPERATION UNIT |
| 3 | CY-XXX | DETECTION UNIT |
| 4 | DY-XXX | ADJUSTMENT UNIT (DDC TYPE) |
| 5 | EY-XXX | ADJUSTMENT UNIT (ELECTRONIC TYPE) |
| 6 | FY-XXX | AIR SOURCE |
| 7 | GY-XXX | COMMERCIAL POWER SOURCE |
| . | | |
| . | | |
| . | | | an instrumentation apparatus classification database based on the model numbers, and decides a temperature control method employed by an instrumentation indicated in the instrumentation diagram, from the apparatus classification and the connection relation. The control method analysis unit then links the decided temperature control method to the instrumentation diagram accumulated in a case database. A search processing unit extracts a corresponding instrumentation diagram by searching the case database based on a temperature control method designated as a search condition.

14 Claims, 8 Drawing Sheets

(51) Int. Cl.
*G06F 16/538* (2019.01)
*G06F 16/535* (2019.01)
*G06F 16/25* (2019.01)
*G06F 30/12* (2020.01)

(58) Field of Classification Search
CPC .......... G06F 30/00; G06F 30/12; G06F 17/50; G06F 16/53; G06F 16/583; G06F 17/30; G06F 16/58; G06F 16/25; G06F 2111/20; G06F 30/13; G06K 9/00; G06K 7/00; G06K 7/10; G01T 5/02; G10L 15/00; G10L 17/00

See application file for complete search history.

(56) References Cited

U.S. PATENT DOCUMENTS

| | | | | |
|---|---|---|---|---|
| 2008/0036781 | A1* | 2/2008 | Okada | G06F 30/00 345/530 |
| 2009/0207262 | A1* | 8/2009 | Kurosawa | H04N 21/422 348/211.99 |
| 2011/0213488 | A1* | 9/2011 | Suzuki | G05B 23/0272 700/109 |
| 2012/0136608 | A1 | 5/2012 | Yoshinaga et al. | |
| 2015/0264547 | A1* | 9/2015 | Kobayashi | G08B 21/12 455/404.2 |
| 2015/0268072 | A1* | 9/2015 | Fujiwara | G01D 1/16 702/183 |
| 2015/0347972 | A1* | 12/2015 | Yamaoka | G06Q 10/06 705/300 |

FOREIGN PATENT DOCUMENTS

| | | |
|---|---|---|
| JP | 2014-85915 A | 5/2014 |
| JP | 2015-99413 A | 5/2015 |

* cited by examiner

INSTRUMENTATION APPARATUS INFORMATION

| No | MODEL NUMBER | APPARATUS CLASSIFICATION |
|---|---|---|
| 1 | AY-XXX | DETECTION UNIT AND ADJUSTMENT UNIT |
| 2 | BY-XXX | OPERATION UNIT |
| 3 | CY-XXX | DETECTION UNIT |
| 4 | DY-XXX | ADJUSTMENT UNIT (DDC TYPE) |
| 5 | EY-XXX | ADJUSTMENT UNIT (ELECTRONIC TYPE) |
| 6 | FY-XXX | AIR SOURCE |
| 7 | GY-XXX | COMMERCIAL POWER SOURCE |
| ⋮ | | |

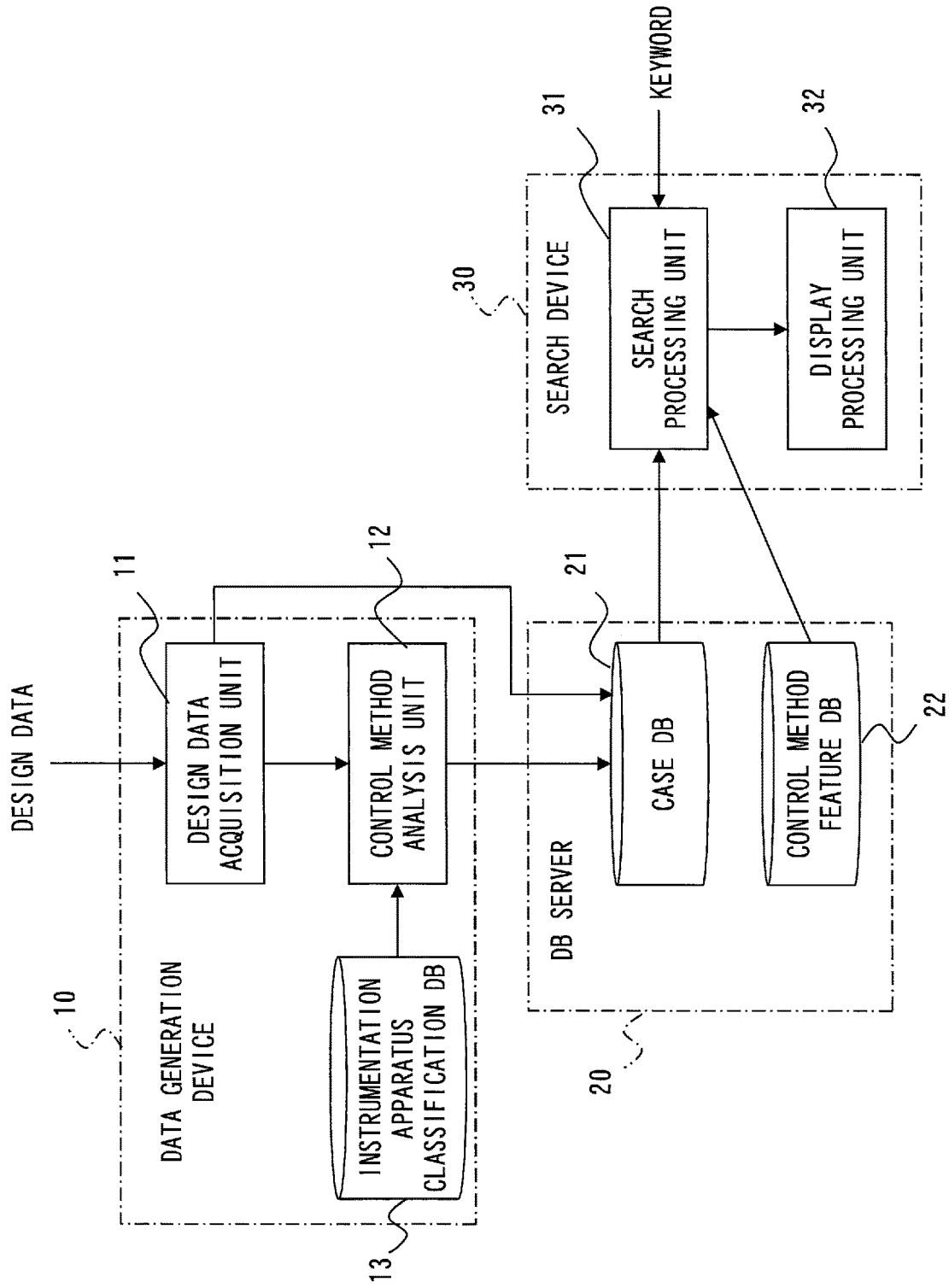

Fig. 8

| FEATURE INFORMATION | ELECTRIC TYPE | ELECTRONIC TYPE | DDC TYPE | AIR TYPE |
|---|---|---|---|---|
| PRINCIPLE | · PHYSICAL DISPLACEMENT OF BELLOWS, DIAPHRAGM, NYLON RIBBON, OR THE LIKE IS USED<br>· DETECTION UNIT AND ADJUSTING UNIT ARE INTEGRATED | · RESISTANCE TEMPERATURE SENSOR, BRIDGE CIRCUIT, AND ELECTRONIC CIRCUIT ARE USED<br>· TRANSMISSION BY ELECTRIC CURRENT, VOLTAGE SIGNAL<br>· POPULAR ADJUSTMENT UNITS ARE OF DIGITAL TYPE INCORPORATING MICROPROCESSOR | · DIGITAL CIRCUIT IS USED<br>· COMMUNICATE WITH CENTRAL MONITOR BY DIGITAL SIGNAL<br>· HIGH-DEGREE CONTROL IS REALIZED BY BUILT-IN PROGRAM | · AIR PRESSURE EQUILIBRIUM TYPE UTILIZING NOZZLE AND FLAPPER<br>· AVAILABLE IN DETECTION UNIT/ADJUSTING UNIT INTEGRATED TYPE AND SEPARATE TYPE<br>· HIGH-ACCURACY TYPE FOR INDUSTRIAL USE AVAILABLE |
| OPERATION SOURCE | COMMERCIAL POWER SOURCE | COMMERCIAL POWER SOURCE | COMMERCIAL POWER SOURCE | AIR SOURCE |
| ACCURACY | △ | ○ | ○ | △ |
| DETECTION PERFORMANCE/ TRANSMISSION RESPONSIVENESS | △ | ○ | ○ | △ |
| OPERATION UNIT RESPONSIVENESS | △ | ○ | ○ | ○ |
| CONTROL OPERATION | 2 POSITIONS PROPORTIONAL | 2 POSITIONS PROPORTIONAL PID CASCADE COMPENSATION | 2 POSITIONS PROPORTIONAL PID CASCADE COMPENSATION | PROPORTIONAL COMPENSATION |
| FUNCTION | — | INSTRUCTION CENTRAL MONITORING MEASUREMENT CENTRAL MONITORING SETTING | INSTRUCTION CENTRAL MONITORING MEASUREMENT CENTRAL MONITORING SETTING VARIABLE TYPES OF COMPOSITE COMPUTATION CONTROL AMENITY CONTROL ENERGY-SAVING CONTROL | |
| CONTROL TARGET | TEMPERATURE HUMIDITY PRESSURE | TEMPERATURE HUMIDITY DEW POINT TEMPERATURE PRESSURE FLOW RATE OTHERS | TEMPERATURE HUMIDITY DEW POINT TEMPERATURE PRESSURE FLOW RATE OTHERS | TEMPERATURE HUMIDITY PRESSURE |
| HANDLING EASINESS | ◎ | △ | △ | × |
| CONSTRUCTION EASINESS | ◎ | ○ | ○ | × |
| EXPLOSION PROTECTION | × | △ | △ | ○ |
| ECONOMY | INEXPENSIVE FOR SIMPLE CONTROL | EXPENSIVE THAN ELECTRIC TYPE | IN CERTAIN SCALE OR MORE, LESS EXPENSIVE THAN ELECTRIC TYPE WHEN COMBINED WITH CENTRAL MONITORING | INEXPENSIVE FOR SIMPLE INSTRUMENTATION DESIGN/CONSTRUCTION CASES ARE FEW IN RECENT BUILDING AIR CONDITION. STUDY NECESSARY FOR APPLICATION TO BUILDING |

INSTRUMENTATION DIAGRAM DATA GENERATION DEVICE, INSTRUMENTATION DIAGRAM SEARCH SYSTEM, AND COMPUTER READABLE MEDIUM

TECHNICAL FIELD

The present invention relates to an instrumentation diagram data generation device, an instrumentation diagram search system, and a program and, more particularly, to a keyword search of an instrumentation diagram.

BACKGROUND ART

In the instrumentation design work, there are many cases where reference is made to past cases to facilitate design. In order to efficiently narrow an enormous amount of past cases down to desired cases, conventionally, a technology is proposed which registers, as design data of past cases, project information including an instrumentation diagram, a project name, an ordering party, and so on, and building information including a building scale, the width in square meters, a layout, and so on, with a database, and searches for desired design data by a keyword search (for example, Patent Literature 1).

CITATION LIST

Patent Literature

Patent Literature 1: JP 2008-192009
Patent Literature 2: JP 2012-113538
Patent Literature 3: JP 2015-099413
Patent Literature 2: JP 2014-085915

SUMMARY OF INVENTION

Technical Problem

However, since the pieces of design data often include many common terms, they cannot be narrowed down as expected even if a keyword search is performed. In particular, since the terms indicated in a temperature control method are not described in the instrumentation diagram, when a keyword search is to be performed in terms of the temperature control method, an instrumentation diagram employing a different temperature control method also hits, and narrowing down cannot be achieved.

It is an objective of the present invention to enable identification of a temperature control method employed by an instrumentation indicated in an instrumentation diagram, from the instrumentation diagram.

Solution to Problem

An instrumentation diagram data generation device according to the present invention includes: a design data acquisition unit to acquire a digital instrumentation diagram; and a control method analysis unit to acquire instrumentation apparatus information including model numbers of apparatuses that can be drawn on the instrumentation diagram and configurations of the apparatuses, to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, to decide a temperature control method employed by an instrumentation indicated in the instrumentation diagram based on the identified apparatus, and to associate the decided temperature control method with the instrumentation diagram and to save the temperature control method in a case database.

Advantageous Effects of Invention

According to the present invention, a temperature control method employed by an instrumentation indicated in an instrumentation diagram can be identified from the instrumentation diagram.

Also, even in cases where a plurality of temperature control methods are employed by an instrumentation indicated in an instrumentation diagram, these temperature control methods can be identified reliably.

Also, an instrumentation diagram can be searched for by designating a temperature control method as a search condition.

Also, an instrumentation diagram can be searched for by designating a feature of a temperature control method as a search condition.

Also, if a feature of a temperature control method is expressed as quantitative data, an instrumentation diagram can be searched for by designating a range as a search condition.

BRIEF DESCRIPTION OF DRAWINGS

FIG. 7 is a block configuration diagram of an instrumentation diagram search system of Embodiment 2.

FIG. 8 is a diagram illustrating an example of a data configuration of feature information registered with a control method feature database of Embodiment 2.

DESCRIPTION OF EMBODIMENTS

Preferred embodiments of the present invention will be described with reference to the drawings.

Embodiment 1

Figure 1:
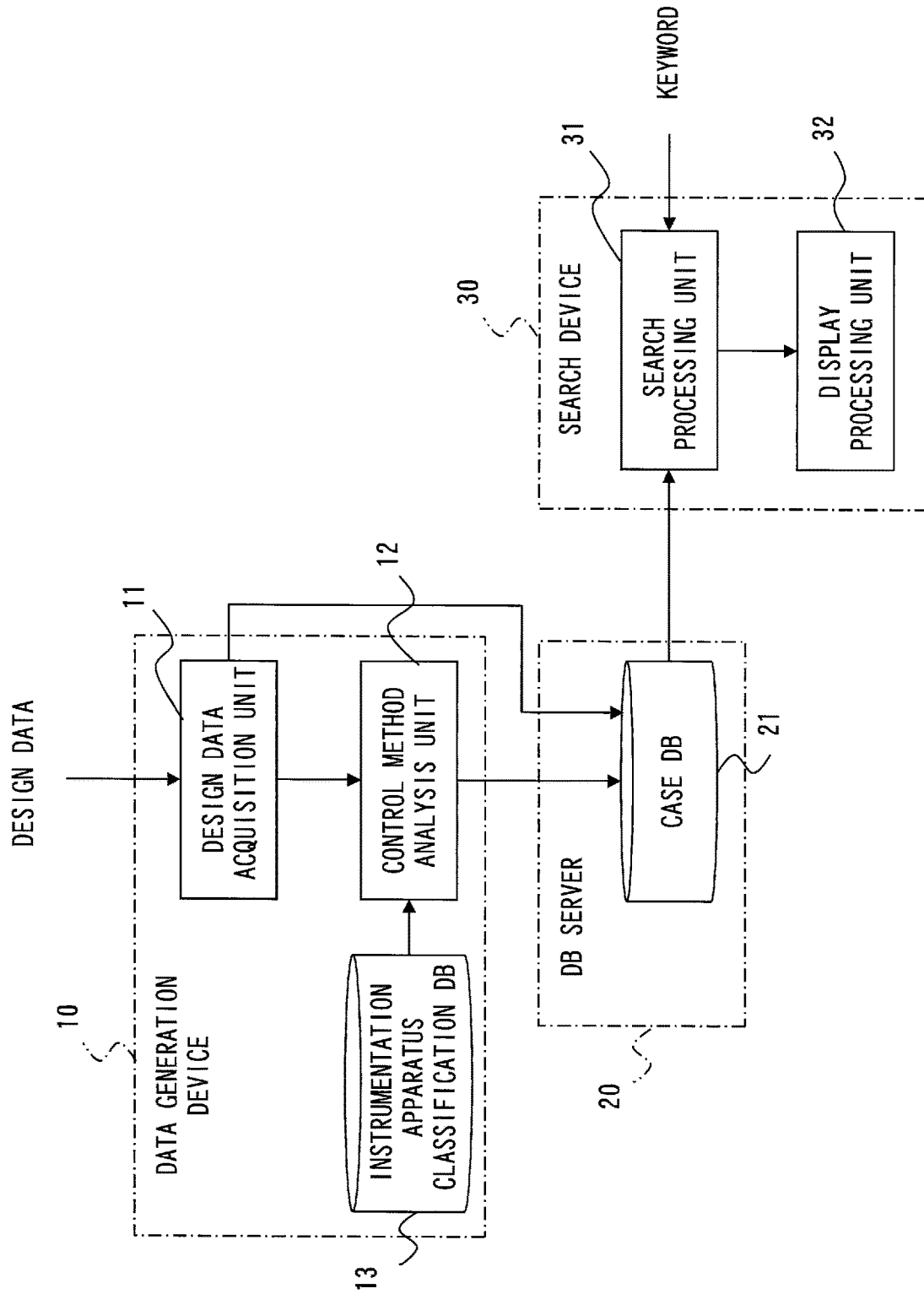
FIG. 1 is an overall configuration diagram illustrating Embodiment 1 of an instrumentation diagram search system according to the present invention.

FIG. 1 is an overall configuration diagram illustrating an embodiment of an instrumentation diagram search system according to the present invention. FIG. 1 also illustrates block configurations of respective devices. The instrumentation diagram search system according to this embodiment includes a data generation device 10, a database (DB) server 20, and a search device 30. In the configuration of this embodiment, the devices are divided according to the functions such as a function of generating data as a search target, a function of storing the data, and a function of searching for the data. However, the two, three, or all of the devices may be integrated.

"Instrumentation" in this embodiment refers to a facility for automatically controlling equipment such as air conditioning equipment of a building. An instrumentation diagram is design data in which an instrumentation is presented in the form of a diagram. An instrumentation diagram to be dealt with in this embodiment will now be explained.

Figure 2:
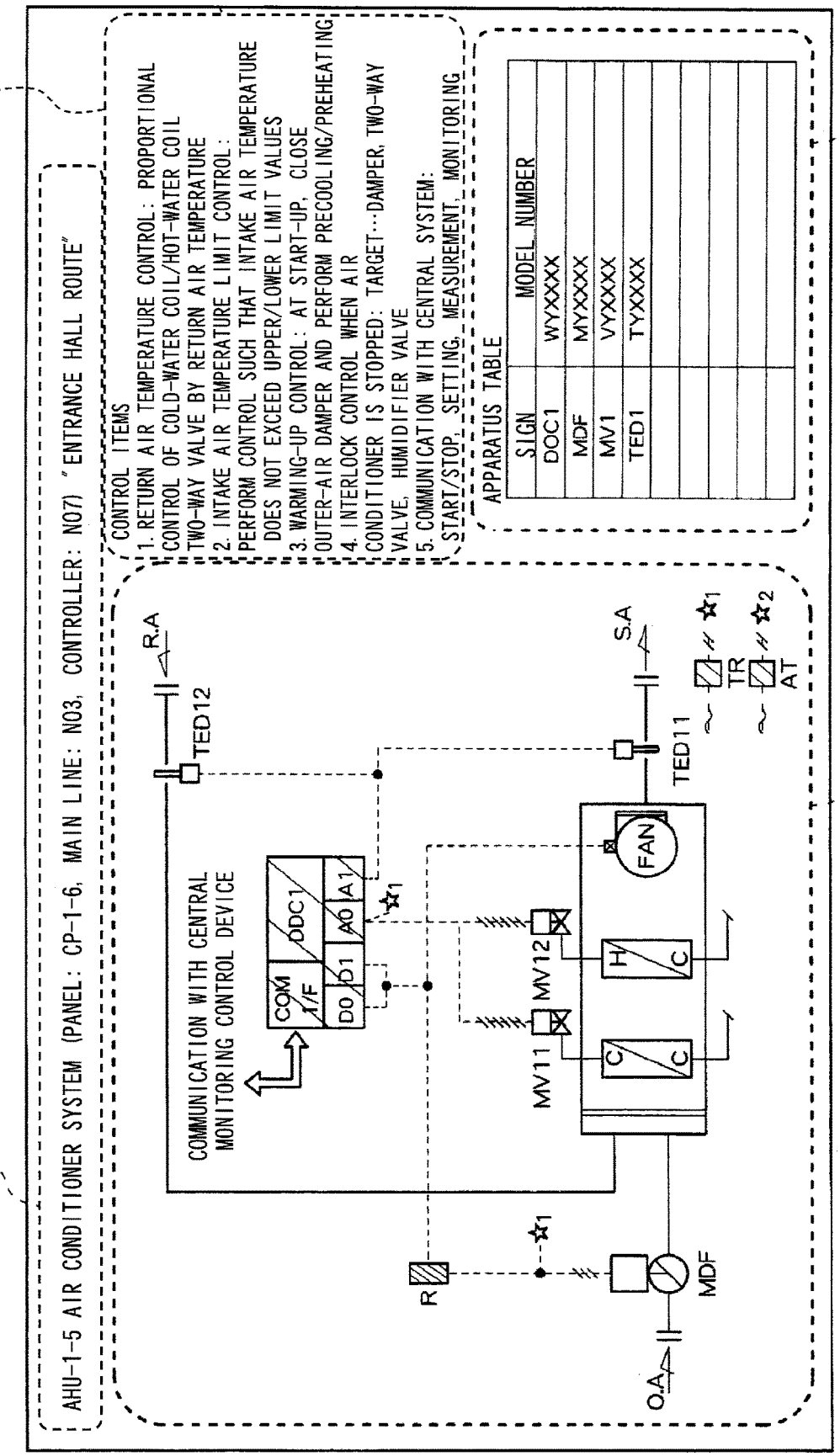
FIG. 2 is a diagram illustrating an indication example of a general instrumentation diagram.

FIG. 2 is a diagram illustrating an indication example of a general instrumentation diagram. The instrumentation diagram contains an area 41 for a title indicating a location of equipment illustrated in the diagram, an area 42 for diagram illustrating a configuration of an instrumentation facility, an area 43 for explaining an operation outline of the instrumentation facility of the diagram, and an area 44 for an apparatus table illustrating a correspondence relation between signs of apparatuses on the drawing and model numbers of the apparatuses. In this manner, one instrumentation diagram sheet indicates these four types of information. This embodiment will deal with an instrumentation diagram digitized as CAD data.

Figures 3, 4:
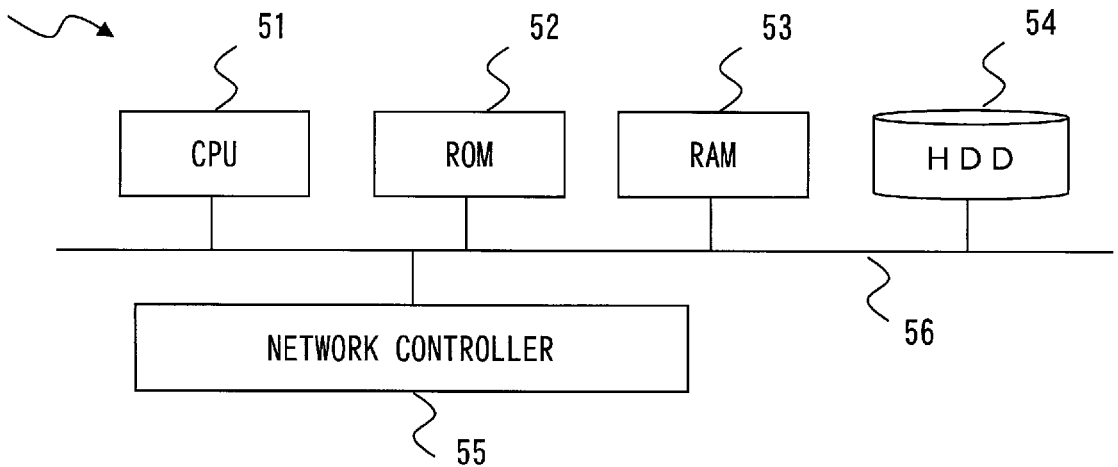
FIG. 3 is a hardware configuration diagram of a computer that makes up a data generation device of Embodiment 1.
FIG. 4 is a diagram illustrating a data configuration example of instrumentation apparatus information registered with an instrumentation apparatus classification database of Embodiment 1.

FIG. 3 is a hardware configuration diagram of a computer that makes up the data generation device 10 of this embodiment. In this embodiment, the computer that makes up the data generation device 10 can be implemented by a conventionally existing versatile hardware configuration. More specifically, the computer is configured by connecting a CPU 51, a ROM 52, a RAM 53, a hard disk drive (HDD) 54, and a network controller 55 which is provided as a communication means, to an internal bus 56. The computer may be configured to include a user interface means such as a mouse, a keyboard, and a display where necessary. In this embodiment, the user interface means is not illustrated in the drawing as it is not necessary. The database server 20 and the search device 30 are computers identical to that of the data generation device 10 and can accordingly be illustrated in the same manner as in FIG. 2. Note that the search device 30 requires a user interface means as mentioned above for the user to enter a keyword.

Back to FIG. 1, the data generation device 10 in this embodiment has a design data acquisition unit 11, a control method analysis unit 12, and an instrumentation apparatus classification database (DB) 13. The design data acquisition unit 11 acquires digital design data from the outside and saves it in a case database 21. Case data to be dealt with in this embodiment includes information that concerns past cases related to instrumentation. This information includes an instrumentation diagram, project information, and building information. The instrumentation diagram has already been explained. The project information includes information concerning the project such as a project name and an ordering party. The building information includes information such as a building size, a width in square meters, and a layout which concern a building where the instrumentation is installed. The control method analysis unit 12 acquires the instrumentation diagram out of the design data acquired by the design data acquisition unit 11 and decides a temperature control method (to be simply referred to as "control method" hereinafter) employed by the instrumentation indicated in the instrumentation diagram, based on the acquired instrumentation diagram and the instrumentation apparatus information stored in the instrumentation apparatus classification database 13. The control method analysis unit 12 then associates the control method identified by the decision with the instrumentation diagram saved in the case database 21. In this manner, the control method analysis unit 12 according to this embodiment functions as an instrumentation apparatus information acquisition means, a decision means, and an associating means.

FIG. 4 is a diagram illustrating a data configuration example of the instrumentation apparatus information registered with the instrumentation apparatus classification database 13. The instrumentation apparatus information is set by correlating the model numbers of apparatuses which can be drawn in the instrumentation diagram and the configurations of the apparatuses (apparatus classification) to identification numbers.

The configuration elements 11 and 12 in the data generation device 10 are implemented by a cooperative operation of the computer that makes up the data generation device 10 and a program that runs in the CPU 51 mounted in the computer. The instrumentation apparatus classification database 13 is implemented by the HDD 54 mounted in the data generation device 10. Alternatively, a storage means existing outside may be utilized as the instrumentation apparatus classification database 13 via a network.

The database server 20 has the case database (DB) 21 provided as instrumentation design information storage means. As described above, the case database 21 stores design data of each case, and each piece of design data includes information that concerns the past cases related to instrumentation. This information includes the instrumentation diagram, the project information, and the building information. Particularly, the control method identified by the control method analysis unit 12 is associated with the instrumentation diagram dealt with in this embodiment. The case database 21 is implemented by the HDD mounted in the database server 20.

The search device 30 has a search processing unit 31 and a display processing unit 32. The search processing unit 31 searches the case database 21 with using the designated control method as a keyword, so as to extract an instrumentation diagram that hits the keyword. The display processing unit 32 causes the display to display information concerning a corresponding instrumentation diagram, by the search conducted by the search processing unit 31.

The configuration elements 31 to 32 in the search device 30 are implemented by the cooperative operation of the computer that makes up the search device 30 and a program that runs in the CPU mounted in the computer.

The program employed in this embodiment cannot only be provided by a communication means. The program can also be saved in a computer-readable recording medium such as a CD-ROM and a USB memory, and the computer-readable recording medium storing the program can be provided. The program provided by the communication means or the recording medium is installed in the computer, and the CPU of the computer sequentially executes the program, so that different types of processes are realized.

When extracting a desired instrumentation diagram from an enormous amount of instrumentation diagrams accumulated in the case database 21, sometimes the instrumentation diagrams may be narrowed down in terms of the control method. In this case as well, as illustrated in FIG. 2, the control method employed by the instrumentation is not clearly written in the instrumentation diagram. In spite of that, according to the characteristic feature of this embodiment, a search of the instrumentation diagram can be performed in terms of the control method.

Figure 5:
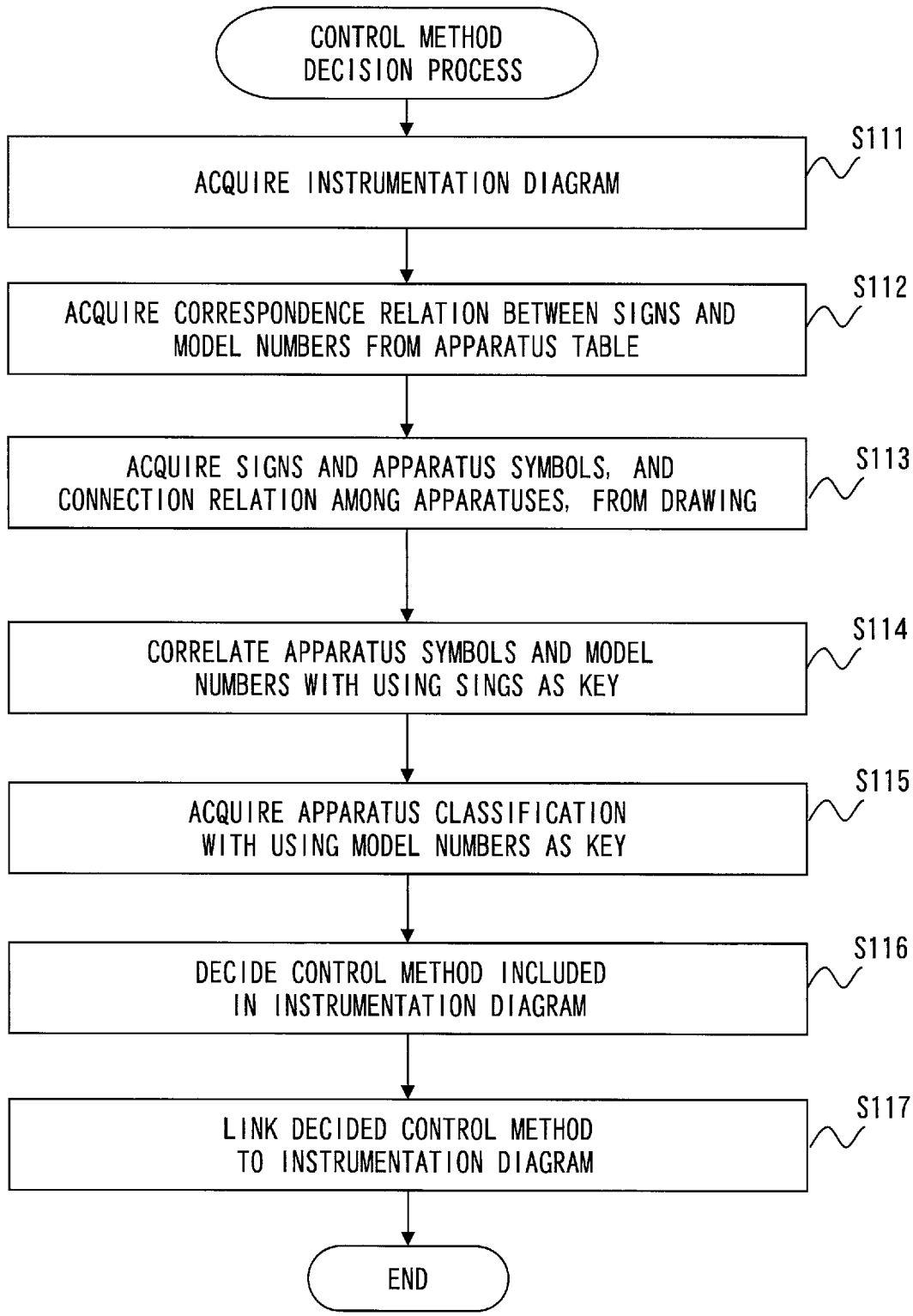
FIG. 5 is a flowchart illustrating a control method decision process of Embodiment 1.

A process of deciding a control method employed by an instrumentation written in an instrumentation diagram, from an instrumentation diagram in this embodiment will now be described by using the flowchart illustrated in FIG. 5.

After acquiring design data to be registered with the case database 21, the design data acquisition unit 11 in the data generation device 10 registers the design data with the case database 21 (step 111). In the registration, the design data acquisition unit 11 sends the instrumentation diagram to the control method analysis unit 12 as well.

After accepting the instrumentation diagram from the design data acquisition unit 11, first, the control method analysis unit 12 acquires the correspondence relation between the signs and the model numbers from an apparatus table contained in the instrumentation diagram (step 112). More specifically, as the area 44 and types of the apparatus table are known, the control method analysis unit 12 extracts the correspondence relation between the signs and the model numbers by OCR-processing the area 44.

Subsequently, the control method analysis unit 12 image-analyzes a drawing contained in the instrumentation diagram so as to acquire the signs and apparatus symbols, and the connection relation among the apparatuses, from the drawing (step 113). The machine symbols are signs used for expressing the apparatuses by images on the diagram. The signs are signs used for expressing the apparatus symbols by character strings. As the signs are indicated in the vicinities of the apparatus symbols, the correspondence relation can be recognized with ease. The control method analysis unit 12 detects the connection relation by analyzing the connection relation of the wires.

Subsequently, the control method analysis unit 12 correlates the model numbers and the apparatus symbols to each other based on the signs and model numbers acquired in step 112 and the signs and the apparatus symbols acquired in step 113 (step 114). Furthermore, the control method analysis unit 12 acquires the apparatus classification drawn on the drawing by searching the instrumentation apparatus classification database 13 with using the model numbers as the key (step 115).

Figure 6:
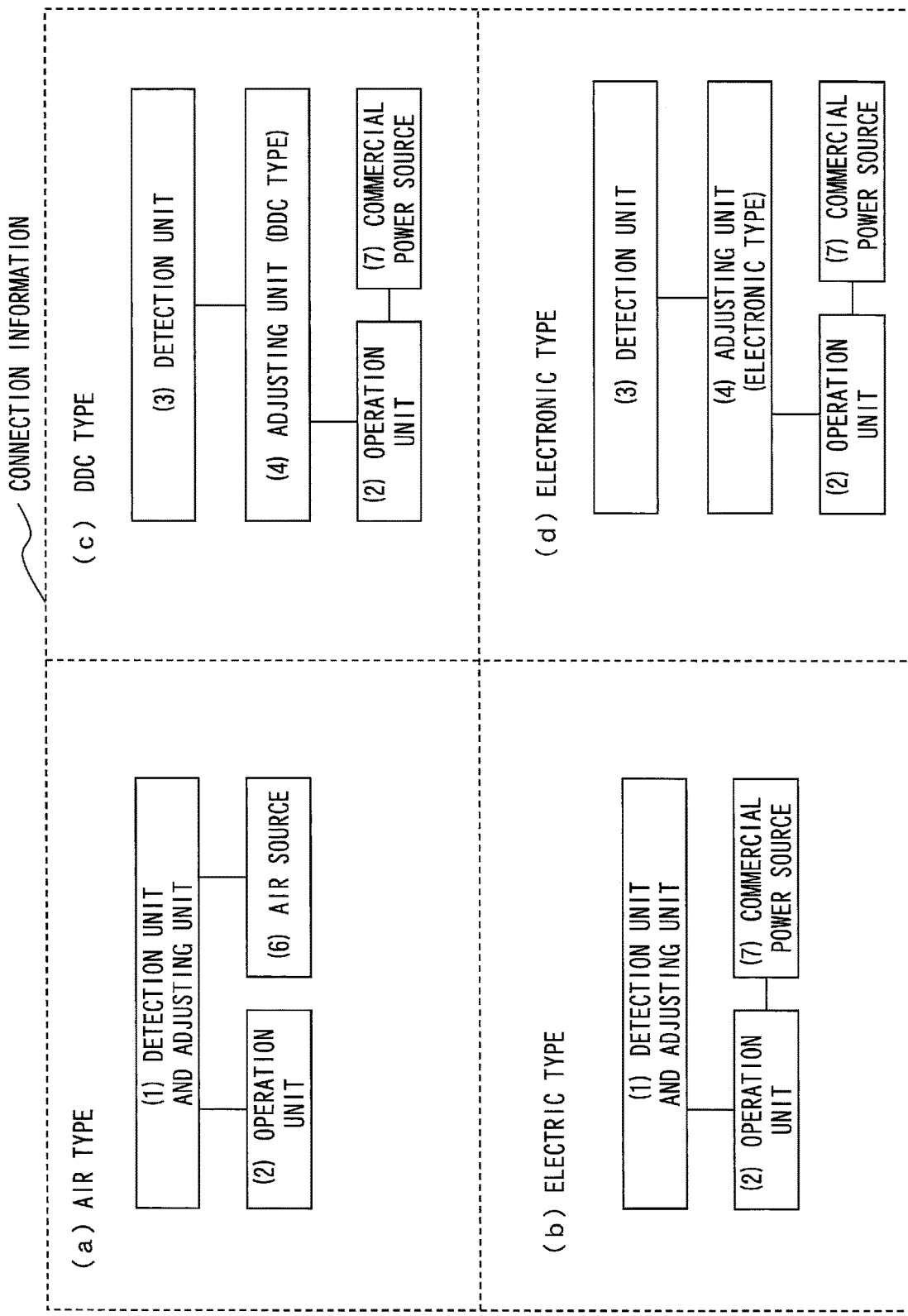
FIG. 6 is a concept diagram schematically representing connection relations of apparatuses of respective temperature control methods.

FIG. 6 is a concept diagram schematically representing connection relations of apparatuses of the respective temperature control methods written in the instrumentation diagram. As illustrated in FIG. 6, the connection relation of the apparatus differs according to the control method. That is, if the connection relation of an apparatus (apparatus classification) drawn on the drawing can be recognized, the control method employed by the instrumentation indicated in the drawing can be identified. Hence, in this embodiment, the control method drawn on the diagram is decided (step 116) based on the connection relation acquired in step 113 and the apparatus classification acquired in step 115. Alternatively, connection information indicating the connection relations illustrated in FIG. 6 may be prepared, and the control method employed by the instrumentation may be decided by collation with the connection information. Then, the control method analysis unit 12 registers the control method obtained by the decision with the case database 21 such that the control method is linked to the instrumentation diagram (step 117).

In this embodiment, the instrumentation diagram is image-analyzed in the above manner, so that the control method employed by the instrumentation indicated in the instrumentation diagram can be identified from the information included in the instrumentation diagram.

The explanation of this embodiment is based on the presupposition that one of the four types of control methods consisting of air type, electric type, DDC type, and electronic type will be employed. However, the control method need not be limited to these four types. If a control method other than these four types is to be employed, its connection relation may be defined in the same manner as illustrated in FIG. 6.

There is a case where once the model number is acquired from the apparatus table in step 112, the control method can be uniquely identified by searching the instrumentation apparatus classification database 13 with the acquired model number. For example, if a model number "DY-XXX" is obtained in step 112, the control method employed by the instrumentation can be identified as DDC type by referring to the instrumentation apparatus classification database 13. In this case, steps 113 to 115 mentioned above are unnecessary. If it is presupposed that only one control method is to be employed by the instrumentation, steps 113 to 115 can be omitted. However, there may also be a case where a plurality of control methods are employed by the instrumentation. In this case, while the DDC type can be identified as the control method, the other control methods will not be counted in for identification.

Regard this, in this embodiment, steps 113 to 115 are performed, so that even a case where a plurality of control methods are employed by the instrumentation can be dealt with. The plurality of control methods being employed by the instrumentation involve not only cases where different types of control methods are employed but also cases where a plurality of control methods of the same type are employed. Basically, the connection relations illustrated in FIG. 6 will not be altered. Therefore, the connection information concerning the connection relations may be set in the control method analysis unit 12 and used for collation. Alternatively, a configuration may be possible in which the connection information is registered with a storage means (not illustrated), and that the control method analysis unit 12 acquires the connection information from the storage means as necessary.

In the above manner, the instrumentation diagram to which the control method employed by the instrumentation is linked is registered with the case database 21.

When a user wishing to extract desired design data from the case database 21 performs a predetermined operation on the search device 30, the search processing unit 31 causes the display to display a search condition input window (not illustrated) in response to the operation. The search condition setting window is made to be added to the conventional setting window so that the control method can be designated. When the user enters and designates a control method via this setting window, the search processing unit 31 performs a keyword search on the case database 21 based on the designated control method. In the display processing unit 32, the result of narrowing down in terms of the control method, namely, the instrumentation diagram in which the designated control method is employed, is displayed on the display in this manner. More specifically, the title and so on of the instrumentation diagram are displayed as a list with consideration being paid to cases where a plurality of instrumentation diagrams correspond. The user can display the instrumentation diagram by selecting the title and so on of the instrumentation diagram to be displayed, from the displayed list.

Embodiment 2

In above Embodiment 1, a narrowing search of instrumentation diagrams can be performed based on the control methods. Embodiment 2 is characterized in that it further provides a different narrowing search by utilizing the control methods.

FIG. 7 is a block configuration diagram of an instrumentation diagram search system according to this embodiment. The instrumentation diagram search system according to this embodiment has a configuration in which a control method feature database (DB) 22 is added to the database server 20 indicated in Embodiment 1. Devices 10, 20, and 30 may have hardware configurations that are identical with those of Embodiment 1.

FIG. 8 is a diagram illustrating an example of a data configuration of feature information registered with a control method feature database 22 of this embodiment. As illustrated in FIG. 8, the control methods have characteristic elements with respect to different items such as principle, operation source, and accuracy. The control method feature database 22 is provided as a feature information storage means to store feature information indicating the features of the respective control methods.

This embodiment is characterized in that it enables a search of the case database 21 based on these items. More specifically, as compared to Embodiment 1 where the control methods can be designated as the search keywords, in this embodiment, the items illustrated in FIG. 8 can be designated as the search keywords.

That is, when a user wishing to extract desired design data from a case database 21 performs a predetermined operation on the search device 30, a search processing unit 31 causes a display to display a search condition input window (not illustrated) in response to the operation. The search condition setting window is made to be added to the setting window of Embodiment 1 so that the items mentioned above can be designated. For example, assume that accuracy is selected as the item and that search execution is requested with designating "Δ" as a search condition value. Then, the search processing unit 31 searches the control method feature database 22 based on the accuracy "Δ". According to the feature information indicated in FIG. 8, the control methods having accuracies "Δ" are of electric type or air type. Therefore, the search processing unit 31 extracts electric type and air type by searching the control method feature database 22, and extracts an instrumentation diagram whose control method is of the electric type and an instrumentation diagram whose control method is of the air type, by searching the case database 21 based on the extracted electric type and air type.

In this manner, according to this embodiment, narrowing down to desired instrumentation diagrams can be performed according to the features of the control methods. As described above, an instrumentation exists that employs a plurality of control methods. For example, assume that a DDC type control method and an electric type control method are employed. The accuracy of the DDC type is expressed as "o" and the accuracy of the electric type is expressed as "Δ". The instrumentation of the DDC type control method and the instrumentation of the electric type control method are extracted by both a search with the accuracy "o" and a search with the accuracy "Δ". According to this embodiment, instrumentation diagrams are extracted from a wide range in this manner. In other words, a loose-narrowing search can be performed.

The process in the data generation device 10 which registers the instrumentation diagram with the case database 21 such that the control method is linked to the instrumentation diagram, may be the same as that in Embodiment 1 and accordingly its description will be omitted.

Embodiment 3

Figure 9:
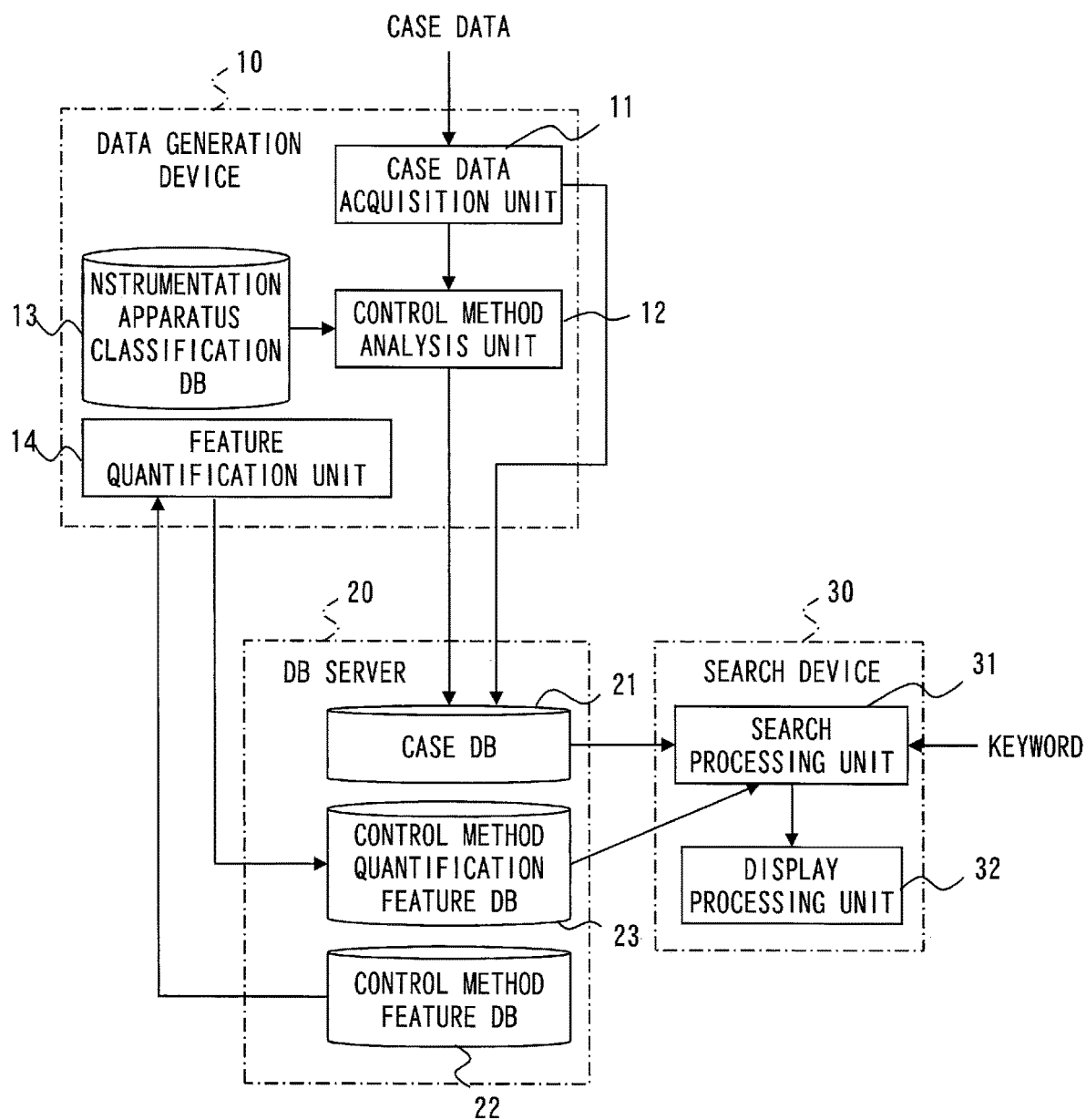
FIG. 9 is a block configuration diagram of an instrumentation diagram search system of Embodiment 3.

FIG. 9 is a block configuration diagram of an instrumentation diagram search system of this embodiment. When compared to the configuration indicated in Embodiment 2, the instrumentation diagram search system according to this embodiment has a configuration in which a feature quantification unit 14 is added to a data generation device 10 and a control method quantification feature database (DB) 23 is added to a database server 20. The feature quantification unit 14 is provided as a quantification means and converts qualitative data included in a case database 21 into quantitative data depending on a predetermined condition. For example, the accuracies indicated in FIG. 8 which are expressed as "o" and "Δ" are converted into quantitative data of, for example, "o"=100 and "Δ"=50. The quantitative data values may be appropriately set with reference to the actual values of the past. In this manner, the feature quantification unit 14 substitutes qualitative data by numerical value data obtained by conversion into the quantitative data, and generates the control method quantification feature database 23 using the substitute data. The characteristic feature resides in that numerical feature items and non-quantified quantitative data are copied from a control method feature database 22 to the control method quantification feature database 23 directly.

The operation of this embodiment will now be described. The process in the data generation device 10 which registers the instrumentation diagram with the case database 21 such that the instrumentation diagram is linked to the control method, may be the same as that in Embodiment 1 and accordingly its description will be omitted. A search process which is characteristic in this embodiment will be described.

When a user wishing to extract desired design data from the case database 21 performs a predetermined operation on a search device 30, a search processing unit 31 causes a display to display a search condition input window (not illustrated) in response to the operation. The search condition setting window is made to be added to the setting window of Embodiment 2 so that ranges of the items mentioned above can be designated.

For example, assume that accuracy is selected as the item and a range of 50 to 100 is designated as its item value. With this range designation, control methods having accuracies "o" and control methods having accuracies "Δ" are extracted. If a range of 80 and more is designated, control methods having accuracies "o" are extracted. In this manner, the search processing unit 31 identifies the control method by searching the control method quantification feature database 23 based on the search condition designated by the user. The user then searches the case database 21 with using the identified control method as the keyword, thereby extracting a corresponding instrumentation diagram.

As described above, an instrumentation exists that employs a plurality of control methods. For example, assume a case where one DDC type control method and one electric type control method are employed. The accuracy of the DDC type is "o"=100 and the accuracy of the electric type is "Δ"=50. In the instrumentation indicated in this instrumentation diagram (in this case "instrumentation diagram A"), the accuracy calculated by averaging, for example, is 75. In performing a search according to the accuracy, if a range of 80 and more is designated, an instrumentation diagram that employs only one DDC type control method is extracted, but an instrumentation diagram A is not extracted.

The quantitative data of the accuracy of each instrumentation diagram can be known in advance by referring to the control method quantification feature database 23. Thus, when a control method analysis unit 12 registers the instrumentation diagram with the case database 21 such that the instrumentation diagram is linked to the control method, the instrumentation diagram may be registered such that it is linked to quantitative data concerning the control method.

In this embodiment, the control method quantification feature database 23 is formed independently of the control method feature database 22. If the control method feature database 22 is not a search target, qualitative data may be overwritten by quantitative data and the quantitative data may be saved.

In order to clarify the feature of this embodiment, the database server 20 is provided with the control method feature database 22. If the control method feature database 22 is not a search target, the control method feature database 22 may be provided to the data generation device 10 or may be provided outside.

In order to clarify the feature of this embodiment, the search processing unit 31 in this embodiment treats the control method quantification feature database 23 as a search target based on the condition designated by the user. In order to enable a search which is a combination of Embodiment 2 and Embodiment 3, both of the control method feature database 22 and the control method quantification feature database 23 may be treated as a search target. Alternatively, the control method feature database 22 and the control method quantification feature database 23 may be integrated to configure a feature amount information storage means.

A feature of an instrumentation diagram data generation device and of a program which are according to the embodiments of the present invention will be recited again.

The control method analysis unit decides the temperature control method employed by the instrumentation indicated in the instrumentation diagram, based on a connection relation of the apparatus drawn on a diagram contained in the instrumentation diagram. The connection relation has been extracted by image-analyzing the diagram.

An instrumentation diagram search system according to the present invention includes: the instrumentation diagram data generation device; the case database in which instrumentation diagrams associated with temperature control methods by the instrumentation diagram data generation device are accumulated; a search processing unit to search the case database with using a designated temperature control method as a keyword; and a display processing unit to effect displaying information concerning a corresponding instrumentation diagram by a search with the search processing unit.

The instrumentation diagram search system also includes: a control method feature database storing feature information indicating features of the respective temperature control methods, wherein the search processing unit searches the case database with using, as a keyword, a temperature control method which is extracted by searching the control method feature database with using, as a keyword, a feature of a temperature control method designated by a user.

The instrumentation diagram search system also includes: a feature quantification unit to convert qualitative data included in feature information indicating features of respective temperature control methods into quantitative data according to a predetermined condition; and a control method quantification feature database to save the feature information after conversion into the quantitative data.

The instrumentation diagram search system also includes: the instrumentation diagram data generation device described above; and the control method quantification feature database in which the feature information after conversion into the quantitative data by the instrumentation diagram data generation device has been saved, wherein the search processing unit searches the case database with using, as a keyword, a temperature control method which is identified by searching the control method quantification feature database with using, as a keyword, quantitative data designated by a user.

A program according to the present invention causes a computer to execute: a process of acquiring a digital instrumentation diagram; a process of acquiring instrumentation apparatus information including model numbers of apparatuses that can be drawn on the instrumentation diagram and configurations of the apparatuses; a process of extracting a model number from an apparatus table included in the instrumentation diagram and containing a correspondence relation between signs of the apparatuses on a drawing and model numbers of the apparatuses, by image-analyzing the instrumentation diagram, identifying an apparatus corresponding to the extracted model number by referring to the instrumentation apparatus information, and deciding a temperature control method employed by an instrumentation indicated in the instrumentation diagram based on the identified apparatus; and a process of associating the decided temperature control method with the instrumentation diagram and saving the temperature control method in a case database.

An instrumentation diagram data generation device according to the present invention includes: instrumentation diagram acquisition means to acquire a digital instrumentation diagram; instrumentation apparatus information acquisition means to acquire instrumentation apparatus information including model numbers of apparatuses that can be drawn on the instrumentation diagram and configurations of the apparatuses; decision means to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, and to decide a temperature control method employed by an instrumentation indicated in the instrumentation diagram based on the identified apparatus; and associating means to associate the temperature control method decided by the decision means with the instrumentation diagram and to save the temperature control method in instrumentation design information storage means.

The decision means decides the temperature control method employed by the instrumentation indicated in the instrumentation diagram, based on the connection relation of the apparatus drawn on the diagram. The connection relation has been extracted by image-analyzing the diagram contained in the instrumentation diagram.

An instrumentation diagram search system according to the present invention includes: the instrumentation diagram data generation device described above; the instrumentation design information storage means in which instrumentation diagrams associated with temperature control methods by the instrumentation diagram data generation device are accumulated; search processing means to search the instrumentation design information storage means with using a designated temperature control method as a keyword; and display processing means to effect displaying information concerning a corresponding instrumentation diagram by a search with the search processing means.

The instrumentation diagram search system also includes: feature information storage means to store feature information indicating features of the respective temperature control methods. The search processing means searches the instrumentation design information storage means with using, as a keyword, a temperature control method which is extracted by searching the feature information storage means with using, as a keyword, a feature of a temperature control method designated by a user.

The instrumentation diagram search system also includes: feature quantification acquisition means to acquire feature information indicating the features of the respective temperature control methods; quantification means to convert qualitative data included in the feature information acquired by the feature information acquisition means, into quantitative data according to a predetermined condition; and storage means to save the feature information after conversion into the quantitative data to the quantification feature information storage means.

The instrumentation diagram search system also includes: the instrumentation diagram data generation device described above; and the quantification feature information storage means in which the feature information after conversion into the quantitative data by the instrumentation diagram data generation device has been saved. The search processing means searches the instrumentation diagram information storage means with using, as a keyword, a temperature control method which is identified by searching the quantification feature information storage means with using, as a keyword, quantitative data designated by a user.

A program according to the present invention causes a computer to function as: instrumentation diagram acquisition means to acquire a digital instrumentation diagram; instrumentation apparatus information acquisition means to acquire instrumentation apparatus information including model numbers of apparatuses that can be drawn on the instrumentation diagram and configurations of the apparatuses; decision means to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, and to decide a temperature control method employed by an instrumentation indicated in the instrumentation diagram based on the identified apparatus; and association means to associate the temperature control method decided by the decision means with the instrumentation diagram and to save the temperature control method in an instrumentation design information storage means.

REFERENCE SIGNS LIST

10: data generation device; 11: design data acquisition unit; 12: control method analysis unit; 13: instrumentation apparatus classification database (DB); 14: feature quantification unit; 20: database (DB) server; 21: case database (DB); 22: control method feature database (DB); 23: control method quantification feature database (DB); 30: search device; 31: search processing unit; 32: display processing unit; 51: CPU; 52: ROM; 53: RAM; 54: hard disk drive (HDD); 55: network controller; 56: internal bus

The invention claimed is:

1. An instrumentation diagram data generation device comprising:
   processing circuitry
   to acquire a digital instrumentation diagram, and
   to acquire instrumentation apparatus information including model numbers of apparatuses that can be drawn on the instrumentation diagram and configurations of the apparatuses, to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, to decide a temperature control method employed by an instrumentation indicated in the instrumentation diagram based on the identified apparatus, and to associate the decided temperature control method with the instrumentation diagram and to save the temperature control method in a case database.

2. The instrumentation diagram data generation device according to claim 1,
   wherein the processing circuitry decides the temperature control method employed by the instrumentation indicated in the instrumentation diagram, based on a connection relation of the apparatus drawn on a diagram contained in the instrumentation diagram, the connection relation being extracted by image-analyzing the diagram.

3. The instrumentation diagram data generation device according to claim 1, wherein the processing circuitry
   converts qualitative data included in feature information indicating features of respective temperature control methods into quantitative data according to a predetermined condition,
   the instrumentation diagram data generation device comprising a control method quantification feature database to save the feature information after conversion into the quantitative data.

4. An instrumentation diagram search system comprising:
   the instrumentation diagram data generation device according to claim 1; and
   the case database in which instrumentation diagrams associated with temperature control methods by the instrumentation diagram data generation device are accumulated;
   wherein the processing circuitry
   searches the case database with using a designated temperature control method as a keyword, and
   effects displaying information concerning a corresponding instrumentation diagram by a search.

5. The instrumentation diagram search system according to claim 4, comprising:
   a control method feature database storing feature information indicating features of the respective temperature control methods,
   wherein the processing circuitry searches the case database with using, as a keyword, a temperature control method which is extracted by searching the control method feature database with using, as a keyword, a feature of a temperature control method designated by a user.

6. The instrumentation diagram search system according to claim 4, wherein the processing circuitry of the instrument diagram data generating device,
  converts qualitative data included in feature information indicating features of respective temperature control methods into quantitative data according to a predetermined condition,
  the instrumentation diagram data generation device comprising a control method quantification feature database to save the feature information after conversion into the quantitative data; and
  the information diagram search system further comprising,
  the control method quantification feature database in which the feature information after conversion into the quantitative data by the instrumentation diagram data generation device has been saved,
  wherein the processing circuitry searches the case database with using, as a keyword, a temperature control method which is identified by searching the control method quantification feature database with using, as a keyword, quantitative data designated by a user.

7. A non-transitory computer readable medium storing a program that causes a computer to execute:
  a process of acquiring a digital instrumentation diagram;
  a process of acquiring instrumentation apparatus information including model numbers of apparatuses that can be drawn on the instrumentation diagram and configurations of the apparatuses;
  a process of extracting a model number from an apparatus table included in the instrumentation diagram and containing a correspondence relation between signs of the apparatuses on a drawing and model numbers of the apparatuses, by image-analyzing the instrumentation diagram, identifying an apparatus corresponding to the extracted model number by referring to the instrumentation apparatus information, and deciding a temperature control method employed by an instrumentation indicated in the instrumentation diagram based on the identified apparatus; and
  a process of associating the decided temperature control method with the instrumentation diagram and saving the temperature control method in a case database.

8. An instrumentation diagram data generation device comprising:
  processing circuitry
  to acquire a digital instrumentation diagram,
  to acquire instrumentation apparatus information including model numbers of apparatuses that can be drawn on the instrumentation diagram and configurations of the apparatuses,
  to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, and to decide a temperature control method employed by an instrumentation indicated in the instrumentation diagram based on the identified apparatus, and
  to associate the decided temperature control method with the instrumentation diagram and to save the temperature control method in an instrumentation design information storage device.

9. The instrumentation diagram data generation device according to claim 8,
  wherein the processing circuitry decides the temperature control method employed by the instrumentation indicated in the instrumentation diagram, based on a connection relation of the apparatus drawn on a diagram contained in the instrumentation diagram, the connection relation being extracted by image-analyzing the diagram.

10. The instrumentation diagram data generation device according to claim 8, comprising:
  processing circuitry
  to acquire feature information indicating features of respective temperature control methods, and
  to convert qualitative data included in the acquired feature information, into quantitative data according to a predetermined condition; and
  a storage device to save the feature information after conversion into the quantitative data to the quantification feature information storage device.

11. An instrumentation diagram search system comprising:
  the instrumentation diagram data generation device according to claim 8;
  the instrumentation design information storage device in which instrumentation diagrams associated with temperature control methods by the instrumentation diagram data generation device are accumulated, wherein the processing circuitry
  searches the instrumentation design information storage device with using a designated temperature control method as a keyword, and
  effects displaying information concerning a corresponding instrumentation diagram by a search with the search processing means.

12. The instrumentation diagram search system according to claim 11, comprising:
  a feature information storage device to store feature information indicating features of the respective temperature control methods,
  wherein the processing circuitry searches the instrumentation design information storage device with using, as a keyword, a temperature control method which is extracted by searching the feature information storage device with using, as a keyword, a feature of a temperature control method designated by a user.

13. The instrumentation diagram search system according to claim 11,
  wherein the instrument diagram data generating device is further configured to
  acquire feature information indicating features of respective temperature control methods, and
  to convert qualitative data included in the acquired feature information, into quantitative data according to a predetermined condition; and
  the instrument diagram search system further comprising a storage device to save the feature information after conversion into the quantitative data to the quantification feature information storage device;
  wherein the quantification feature information storage device in which the feature information has been saved after conversion into the quantitative data by the instrumentation diagram data generation device,
  wherein the processing circuitry searches the instrumentation diagram information storage device with using, as a keyword, a temperature control method which is identified by searching the quantification feature information storage device with using, as a keyword, quantitative data designated by a user.

14. A non-transitory computer readable medium storing a program that causes a computer to function as:
processing circuitry
to acquire a digital instrumentation diagram,
to acquire instrumentation apparatus information including model numbers of apparatuses that can be drawn on the instrumentation diagram and configurations of the apparatuses,
to extract a model number from an apparatus table included in the instrumentation diagram and containing a correspondence relation between signs of the apparatuses on a drawing and model numbers of the apparatuses, by image-analyzing the instrumentation diagram, to identify an apparatus corresponding to the extracted model number by referring to the instrumentation apparatus information, and to decide a temperature control method employed by an instrumentation indicated in the instrumentation diagram based on the identified apparatus, and
to associate the decided temperature control method with the instrumentation diagram and to save the temperature control method in an instrumentation design information storage device.

* * * * *